United States Patent Office 2,951,791
Patented Sept. 6, 1960

2,951,791

USE OF CALCIUM SILICATE IN TABLET COMPRESSING

Carl Louis Stearns, Orangeburg, N.Y., assignor to American Cyanamid Company, New York, N.Y., a corporation of Maine No Drawing. Filed Aug. 31, 1959, Ser. No. 836,939

2 Claims. (Cl. 167—82)

This invention relates to the production of tablets of therapeutic materials.

In the pharmaceutical industry it is a well-known fact that very few crystalline or powdered materials can be compressed into suitable tablets on automatic tableting equipment in their crystalline or powdered form. The practice has developed of first preparing a granulation of the material, because it is known that the grain-like structure thus formed is suitable for compression into tablets. There are two well-known methods of preparing a granulation, namely, the wet granulating process, and the dry granulating process which is also known as "slugging."

The method of preparing a granulation according to the wet granulating process consists of moistening the dry powder, with or without the addition of an adhesive substance, until the whole is converted into a crumbly mass. The mass is then forced through a screen in order to reduce the material to a grain-like structure of small granules. The most commonly used moistening agent is, of course, water although other solvents are well-known for this purpose. It is also common practice to add a substance such as gelatin, starch, or gum acacia in order to assist in granulating the material.

The method of preparing a granulation according to the dry granulating process consists of pre-compressing the dry powder into oversized tablets or "slugs." These oversized tablets or "slugs" are then broken into a granulation of substantially uniform size.

The present invention is based on the discovery that the addition of not less than about 20% by weight of calcium silicate aerogel to crystalline or powdered materials renders them capable of being compressed directly into suitable tablets on automatic tableting equipment. The present invention completely eliminates the necessity of first preparing a granulation of crystalline or powdered materials before compressing them into tablets. In the tableting art, the elimination of the necessity of first preparing a granulation results in a host of economic advantages. Insofar as the wet granulating process is concerned, the wet mixing, drying, and screening operations are eliminated. Insofar as the dry granulating process is concerned, the pre-compression, breaking, and screening operations are eliminated. In both cases, the amount of equipment, labor and floor space needed is vastly reduced. Furthermore, since by practicing the present invention a compressed tablet can be made eliminating all but the steps of mixing and compressing, there results a great saving of time.

The present invention is not to be confused with the use of small amounts of calcium silicate aerogel as a lubricant in tablet compressing. Lubricants are rarely used in excess of 5% by weight in tablet compressing for the purpose of preventing sticking in the die and promoting the flow of powder in the hopper.

The calcium silicate aerogel that is used in practicing the present invention is one of a number of commercially available siliceous aerogels produced in either the vapor phase or the liquid phase. It is an extremely porous, very light and relatively inert material which has a physical structure which has been described as a tenuous web of microscopic silica filaments. It has a bulk density ranging from 6 to 15 pounds per cubic foot and a surface area of the order of from 100 to 200 square meters per gram. Particle sizes may range from 0.01 to 0.05 micron.

It is indeed surprising that the addition of other siliceous aerogels, such as silica or silicic acid, to crystalline or powdered materials does not render them capable of being compressed directly into suitable tablets on automatic tableting equipment.

Many materials which heretofore were exceedingly difficult to prepare in tablet form, such as, for example, hexylresorcinol, may now be readily tableted by the practice of the present invention. In practicing the present invention, it is only necessary that the crystalline or powdered materials to be tableted are compatible with the calcium silicate aerogel. The material to be tableted may be mixed directly with the calcium silicate aerogel or it may be dissolved in a solvent and the resulting solution may be mixed with the calcium silicate aerogel, after which evaporation of the solvent is effected. Furthermore, the maximum proportion of calcium silicate aerogel which may be employed in practicing the present invention may be very close to 100% by weight in the case of those medicaments which are administered in small amount.

In practicing the present invention, lubricants such as magnesium stearate, fillers such as starch, or disintegrators such as polyvinylpyrrolidone may be added to the mixture of the calcium silicate aerogel and the crystalline or powdered material prior to tableting on automatic tableting equipment.

The following examples are illustrative of the present invention:

Example 1

In 200 parts of anhydrous ethyl alcohol was dissolved 200 parts of hexylresorcinol, and to the resulting solution was added 150 parts of calcium silicate aerogel. After thorough admixture, evaporation of the alcohol was effected, and then 3.5 parts of magnesium stearate was blended into the mixture. The resulting powder was tableted in an automatic tableting machine whereby excellent tablets were obtained.

Example 2

A mixture of 30 parts of 2-acetylamino-1,3,4-thiadiazole-5-sulfonamide, 26 parts of calcium silicate aerogel, 3 parts of starch, and 1 part of magnesium stearate was prepared. The mixture was thoroughly blended and then screened through a 60 mesh screen. The resulting powder was tableted in an automatic tableting machine whereby very good tablets were obtained.

Example 3

A mixture of 15.0 parts of chlortetracycline hydrochloride, 10.5 parts of calcium silicate aerogel, 11.85 parts of starch, and 0.15 part of magnesium stearate was prepared. The mixture was thoroughly blended and then screened through a 30 mesh screen. The resulting powder was tableted in an automatic tableting machine whereby excellent tablets were obtained.

What is claimed is:

1. The process of preparing tablets of therapeutic materials comprising the steps of mixing a non-granulated active therapeutic material with not less than about 20% by weight of calcium silicate aerogel having a particle size of from about 0.01 micron to about 0.05 micron, and forming the mixture thus obtained into tablets by compression.

2. A therapeutic tablet consisting essentially of a non-granulated active therapeutic material and not less than about 20% by weight of calcium silicate aerogel having a particle size of from about 0.01 micron to about 0.05 micron.

References Cited in the file of this patent

UNITED STATES PATENTS

| | | |
|---|---|---|
| 2,059,811 | Sauer | Nov. 3, 1936 |
| 2,768,899 | Waldo | Oct. 30, 1956 |
| 2,868,655 | Landerburg | Jan. 13, 1959 |

FOREIGN PATENTS

| | | |
|---|---|---|
| 533,625 | Great Britain | Feb. 7, 1941 |